(12) United States Patent
Wang et al.

(10) Patent No.: US 10,878,593 B2
(45) Date of Patent: Dec. 29, 2020

(54) PUPIL LOCALIZING METHOD AND SYSTEM

(71) Applicant: Tencent Technology (Shenzhen) Company Limited, Shenzhen (CN)

(72) Inventors: Xinliang Wang, Shenzhen (CN); Bin Li, Shenzhen (CN); Tieming Huang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 76 days.

(21) Appl. No.: 16/380,440

(22) Filed: Apr. 10, 2019

(65) Prior Publication Data

US 2019/0236803 A1 Aug. 1, 2019

Related U.S. Application Data

(63) Continuation of application No. PCT/CN2017/116149, filed on Dec. 14, 2017.

(30) Foreign Application Priority Data

Dec. 15, 2016 (CN) .......................... 2016 1 1161846

(51) Int. Cl.
*G06K 9/00* (2006.01)
*G06T 7/73* (2017.01)

(52) U.S. Cl.
CPC .............. *G06T 7/74* (2017.01); *G06K 9/0061* (2013.01); *G06K 9/00281* (2013.01);
(Continued)

(58) Field of Classification Search
None
See application file for complete search history.

(56) References Cited

U.S. PATENT DOCUMENTS 7,869,626 B2 1/2011 Ko et al.
8,401,248 B1* 3/2013 Moon ................ G06K 9/00597
382/118

(Continued)

FOREIGN PATENT DOCUMENTS

CN 101201893 A 6/2008
CN 102209975 A 10/2011

(Continued)

OTHER PUBLICATIONS

Chinese Office Action Issued in Application CN201611161846.9 dated Jun. 29, 2020 with concise English Translation (15 pages).

(Continued)

*Primary Examiner* — Soo Jin Park
(74) *Attorney, Agent, or Firm* — Oblon, McClelland, Maier & Neustadt, L.L.P.

(57) ABSTRACT

A method, information processing apparatus, and a non-transitory computer-readable storage medium are provided. In the method, a location of an edge of an eye in a first image of a face is determined. An area of the first image based on the determined location is determined. The area of the first image is divided into first and second subareas based on pixel values of the area of the first image. The first subarea includes the pixel values of a first range and the second subarea includes the pixel values of a second range, and an average pixel difference of the first and second ranges is greater than a threshold. The location of the pupil is determined based on a location of one of the first and second subareas when the average pixel difference of the first and second ranges is greater than the threshold.

20 Claims, 7 Drawing Sheets

(52) U.S. Cl.
CPC ..... *G06K 9/00597* (2013.01); *G06K 9/00617* (2013.01); *G06T 2207/20021* (2013.01); *G06T 2207/20081* (2013.01); *G06T 2207/30201* (2013.01)

(56) References Cited

U.S. PATENT DOCUMENTS

| | | |
|---|---|---|
| 8,433,105 B2 | 4/2013 | Choi et al. |
| 2008/0069410 A1 | 3/2008 | Ko et al. |
| 2010/0284576 A1* | 11/2010 | Tosa ............... G06K 9/0061 382/117 |
| 2011/0194738 A1 | 8/2011 | Choi et al. |

FOREIGN PATENT DOCUMENTS

| | | |
|---|---|---|
| CN | 102567737 A | 7/2012 |
| CN | 102902967 A | 1/2013 |
| CN | 103136512 A | 6/2013 |
| CN | 104850228 A | 8/2015 |
| CN | 106203375 A | 12/2016 |

OTHER PUBLICATIONS

Xiaomemg Zhan, "Research on Key Techonolgies of Facial Expression Recognition". China's Excellent Master's Thesis Full-Text Database, Information Technology Series, Issue 7, Jul. 31, 2011 (6 pages).

International Search Report dated Feb. 26, 2018 in International Application No. PCT/CN2017/116149 with English Translation.

\* cited by examiner

PUPIL LOCALIZING METHOD AND SYSTEM

RELATED APPLICATION

This application is a continuation of International Application No. PCT/CN2017/116149, filed on Dec. 14, 2017, which claims priority to Chinese Patent Application No. 201611161846.9, filed on Dec. 15, 2016. The entire disclosures of the prior applications are hereby incorporated by reference in their entirety.

FIELD OF THE TECHNOLOGY

This application relates to the field of information processing technologies for a pupil locating method and system.

BACKGROUND OF THE DISCLOSURE

With the continuous development of human face feature analysis and locating technologies, applications based on the technologies, for example, identification using human face features and human face effects and human face cartoons and animations based on human face features, gradually become popular. When the processing capability of mobile devices is enhanced, it is possible to perform real-time human face detection and tagging algorithm processing on mobile phones. Such applications have become a recent research hotspot.

As an important biological feature of the human face, the pupil has important applications in identification and real-time expression animation. In identification of the human face, the pupil can be used as an important biological feature. In human face animation, animated characters are driven by tracking motion of real pupils, to make animations more realistic. Pupil detection and location are the basis for achieving the applications. Current pupil locating technologies are mainly of two categories. One is a learning-based method. In this method, a model is established for a pupil feature, and a lot of tagged pupil images are learned to obtain a model parameter, and then pupil location is performed by using the obtained model. However, this method takes time to perform model training and learning, and is complex, which cannot meet a real-time requirement. The other is an image-processing-based method. In this method, a rectangular area including an eye part is first detected in an image, then edge detection is performed on an eye part image, and a complete pupil edge is extracted based on edge information and prior geometric knowledge about pupils. However, this method has many interference factors, which is easily affected by external factors such as posture and hair, and has poor robustness.

SUMMARY

The present disclosure discloses a pupil locating method, device, system, and a storage medium, to divide, based on pixel values of an area of a first image of an eye edge in the first image of a face, the area of the first image into two subareas to determine one of the subareas as an area in which a pupil is located.

In one aspect, there is provided a method. For example, the method is performed by processing circuitry of an information processing apparatus. A location of an edge of an eye in a first image of a face is determined. An area of the first image based on the determined location is determined. The area of the first image is divided into first and second subareas based on pixel values of the area of the first image. The first subarea includes the pixel values of a first range and the second subarea includes the pixel values of a second range, and an average pixel difference of the first and second ranges is greater than a threshold. The location of the pupil is determined based on a location of one of the first and second subareas when the average pixel difference of the first and second ranges is greater than the threshold.

In one embodiment, the determining the location of the edge of the eye includes determining a type of the first image based on a preset machine learning model and determining predicted location information corresponding to the determined type of the first image, the determined predicted location information indicating the location of the edge of the eye in the first image. The preset machine learning model includes first classification information, which includes a first classification condition for first face images and predicted location information of edges of eyes corresponding to types of the first face images based on the first classification condition.

In one embodiment, the determining the location of the edge of the eye includes determining, based on a preset machine learning model, a first type of the first image and at least one second type of the first image, wherein the preset machine learning model includes a group of first classification information and at least one group of second classification information, the group of the first classification information includes a first classification condition for first face images and first predicted location information of edges of eyes corresponding to types of the first face images based on the first classification condition of the group; and each of the at least one group of the second classification information includes a second classification condition for second face images, second predicted location information of edges of eyes corresponding to types of the second face images based on the second classification condition of the each of the at least one group of the second classification information, and error values of second the predicted location information. The determining the location of the edge of the eye includes determining a sum of final predicted location information and final error values of the second predicted location information, wherein the final predicted location information is a sum of the first predicted location information corresponding to the determined first type of the first image and the second predicted location information corresponding to the determined at least one second type of the first image; and the final error values of the second predicted location information is a sum of error values of the second predicted location information corresponding to the determined at least one second type of the first image, the determined sum of the final predicted location information and the final error values of the second predicted location information indicating the location of the edge of the eye in the first image. The determining the location of the edge of the eye includes generating a first classification tree. Multiple next-level leaf nodes of a leaf node of the first classification tree correspond to the types of the first face images, which are obtained based on the first classification condition of the first classification information by using the first face images of the leaf node of the first classification tree. The determining the location of the edge of the eye includes storing the first classification information that includes the first predicted location information corresponding to leaf nodes of the first classification tree and the first classification condition. The determining the location of the edge of the eye includes generating at least one second classification tree. Multiple next-level leaf nodes of a leaf node of the at least one second classification tree correspond to the types of the second face images, which are obtained based on the second classification condition of the at least one group of second classification information by using the second face images of the leaf node of the at least one second classification tree. The determining the location of the edge of the eye includes storing the at least one group of second classification information, each of the at least one group of second classification information includes the second predicted location information corresponding to leaf nodes of the respective second classification tree, the second classification condition, and error values of the second predicted location information corresponding to the leaf nodes of the respective second classification tree. The second predicted location information corresponding to the leaf node of the at least one second classification tree is average location information of edges of eyes in second face images of the leaf node. The first classification condition of the first classification information and the second classification condition of the at least one second classification information include an absolute difference between pixel values of two pixels of an eye area in the first face images of the leaf node of the first classification tree and in the second face images of the leaf node of the at least one second classification tree, the absolute difference is greater or not greater than a threshold, and location information of the two pixels.

In one embodiment, the dividing includes graying the pixel values of the area of the first image and dividing the grayed area of the first image into the first and second subareas based on pixel values of the grayed area of the first image.

In one embodiment, the dividing includes determining a first pixel value threshold, wherein a first area of the area of the first image containing a first point with the pixel value greater than the first pixel value threshold, is one of the first and second subareas; and a second area of the area of the first image containing a second point with the pixel value equal to or less than the first pixel value threshold is the other of the first and second subareas. The dividing includes determining a second pixel value threshold, wherein a first grayed area of the area of the first image containing a first point with the pixel value greater than the second pixel value threshold, is one of the first and second subareas; a second grayed area of the area of the first image containing a second point with the pixel value equal to or less than the second pixel value threshold, is the other of the first and second subareas. The determining the second pixel value threshold includes counting frequencies of the pixel values of the grayed second image and selecting a pixel value corresponding to a trough between two peaks of the frequencies of the pixels as the second pixel value threshold, or, in an interval including a trough between two peaks of the frequencies of the pixels, an optimum pixel value corresponding to an optimum value as the second pixel value threshold. An average variance between the optimum pixel value and another pixel value in the second image other than the optimum pixel value is maximized.

In one embodiment, the dividing includes setting a pixel value of one of the first and second subareas, where the pupil is located, to a first value, and a pixel value of the other one of the first and second subareas to a second value. The dividing includes setting, when a frequency of pixels, whose pixel values are the first value, in the one of the first and second subareas is less than a preset frequency, the pixel values of the pixels to the second value.

In one aspect, there is provided a pupil locating device. For example, the device includes processing circuitry configured to determine a location of an edge of an eye in a first image of a face. The processing circuitry is configured to determine an area of the first image based on the determined location. The processing circuitry is configured to divide the area of the first image into first and second subareas based on pixel values of the area of the first image. The first subarea includes the pixel values of a first range and the second subarea includes the pixel values of a second range, and an average pixel difference of the first and second ranges is greater than a threshold. The processing circuitry is configured to determine the location of the pupil based on a location of one of the first and second subareas when the average pixel difference of the first and second ranges is greater than the threshold.

In one embodiment, the processing circuitry is configured to determine a type of the first image based on a preset machine learning model. The processing circuitry is configured to determine predicted location information corresponding to the determined type of the first image. The determined predicted location information indicates the location of the edge of the eye in the first image. The preset machine learning model includes first classification information, which includes a first classification condition for first face images and predicted location information of edges of eyes corresponding to types of the first face images based on the first classification condition.

In one embodiment, the determination of the location of the edge of the eye further includes the processing circuitry configured to determine, based on a preset machine learning model, a first type of the first image and at least one second type of the first image. The preset machine learning model includes a group of first classification information and at least one group of second classification information, the group of the first classification information includes a first classification condition for first face images and first predicted location information of edges of eyes corresponding to types of the first face images based on the first classification condition of the group; and each of the at least one group of the second classification information includes a second classification condition for second face images, second predicted location information of edges of eyes corresponding to types of the second face images based on the second classification condition of the each of the at least one group of the second classification information, and error values of second the predicted location information. The determination of the location of the edge of the eye further includes the processing circuitry configured to determine a sum of final predicted location information and final error values of the second predicted location information. The final predicted location information is a sum of the first predicted location information corresponding to the determined first type of the first image and the second predicted location information corresponding to the determined at least one second type of the first image; and the final error values of the second predicted location information is a sum of error values of the second predicted location information corresponding to the determined at least one second type of the first image, the determined sum of the final predicted location information and the final error values of the second predicted location information indicating the location of the edge of the eye in the first image. The processing circuitry is configured to generate a first classification tree. Multiple next-level leaf nodes of a leaf node of the first classification tree correspond to the types of the first face images, which are obtained based on the first classification condition of the first classification information by using the first face images of the leaf node of the first classification tree. The processing circuitry is configured to store the first classification information that includes the first predicted location information corresponding to leaf nodes of the first classification tree and the first classification condition. The processing circuitry is configured to generate at least one second classification tree. Multiple next-level leaf nodes of a leaf node of the at least one second classification tree correspond to the types of the second face images, which are obtained based on the second classification condition of the at least one group of second classification information by using the second face images of the leaf node of the at least one second classification tree. The processing circuitry is configured to store the at least one group of second classification information, each of the at least one group of second classification information includes the second predicted location information corresponding to leaf nodes of the respective second classification tree, the second classification condition, and error values of the second predicted location information corresponding to the leaf nodes of the respective second classification tree. The second predicted location information corresponding to the leaf node of the at least one second classification tree is average location information of edges of eyes in second face images of the leaf node. The first classification condition of the first classification information and the second classification condition of the at least one second classification information include an absolute difference between pixel values of two pixels of an eye area in the first face images of the leaf node of the first classification tree and in the second face images of the leaf node of the at least one second classification tree, the absolute difference is greater or not greater than a threshold, and location information of the two pixels.

In one embodiment, the divide the area of the first image further includes the processing circuitry configured to gray the pixel values of the area of the first image and divide the grayed area of the first image into the first and second subareas based on pixel values of the grayed area of the first image.

In one embodiment, the divide the area of the first image further includes the processing circuitry configured to determine a first pixel value threshold. A first area of the area of the first image including a first point with the pixel value greater than the first pixel value threshold, is one of the first and second subareas; and a second area of the area of the first image including a second point with the pixel value equal to or less than the first pixel value threshold is the other of the first and second subareas. The divide the area of the first image further includes the processing circuitry configured to determine a second pixel value threshold. A first grayed area of the area of the first image including a first point with the pixel value greater than the second pixel value threshold, is one of the first and second subareas; a second grayed area of the area of the first image including a second point with the pixel value equal to or less than the second pixel value threshold, is the other of the first and second subareas. The determination of the second pixel value threshold includes the processing circuitry configured to count frequencies of the pixel values of the grayed second image and select a pixel value corresponding to a trough between two peaks of the frequencies of the pixels as the second pixel value threshold, or, in an interval including a trough between two peaks of the frequencies of the pixels, an optimum pixel value corresponding to an optimum value as the second pixel value threshold. An average variance between the optimum pixel value and another pixel value in the second image other than the optimum pixel value is maximized.

In on embodiment, after the dividing, set a pixel value of one of the first and second subareas, where the pupil is located, to a first value, and a pixel value of the other one of the first and second subareas to a second value. The processing circuitry is further configured to set, when a frequency of pixels, whose pixel values are the first value, in the one of the first and second subareas is less than a preset frequency, the pixel values of the pixels to the second value.

In one aspect, there is provided a non-transitory computer-readable medium storing instructions which when executed by at least one processor cause the at least one processor to perform determining a location of an edge of an eye in a first image of a face, determining an area of the first image based on the determined location, dividing the area of the first image into first and second subareas based on pixel values of the area of the first image. The first subarea includes the pixel values of a first range and the second subarea includes the pixel values of a second range, and an average pixel difference of the first and second ranges is greater than a threshold, and determining the location of the pupil based on a location of one of the first and second subareas when the average pixel difference of the first and second ranges is greater than the threshold.

In some embodiments, there are provided a non-transitory computer-readable storage medium storing instructions which when executed by at least one processor cause the at least one processor to perform any of the methods described above.

As can be seen, in the method of the embodiments, during pupil location, a pupil locating system first tags location information of an edge of an eye in a to-be-processed human face image based on a preset machine learning model, and then performs image division processing based on pixel values of an area, that is, a first image, indicated by the tagged location information to obtain images of two subareas, to determine a subarea, that is, a foreground part area, in the images of the two subareas as an area in which a pupil of an eye is located in the to-be-processed human face image. Therefore, location information of an edge of an eye can be tagged by using a simple machine learning model, and then real-time pupil location can be implemented by using an image processing method, which reduces complexity and locates a pupil of an eye more accurately as compared with the existing technology in which location information of a pupil of an eye is directly tagged.

BRIEF DESCRIPTION OF THE DRAWINGS

To describe the technical solutions in the embodiments of this application or in the existing technology more clearly, the following briefly describes the accompanying drawings for describing the embodiments or the existing technology. The accompanying drawings in the following description show merely some embodiments of this application, and persons of ordinary skill in the art may still derive other drawings from these accompanying drawings.

DESCRIPTION OF EMBODIMENTS

The following describes the technical solutions in the embodiments of this application with reference to the accompanying drawings in the embodiments of this application. The described embodiments are merely some but not all of the embodiments of this application. All other embodiments obtained by persons of ordinary skill in the art based on the embodiments of this application shall fall within the protection scope of this application.

In the specification, claims, and accompanying drawings of this application, the terms "first", "second", "third", "fourth", and so on (if existent) are intended to distinguish between similar objects but do not indicate a specific order or sequence. It is understood that, the data termed in such a manner are interchangeable in a proper circumstance, so that the embodiments of this application described herein can be implemented, for example, in other orders than those illustrated or described herein. Moreover, the terms "include", "contain" and any other variants mean to cover the non-exclusive inclusion, for example, a process, method, system, product, or device that includes a list of steps or units is not limited to those units, but may include other steps or units not expressly listed or inherent to such a process, method, system, product, or device.

Figure 1:
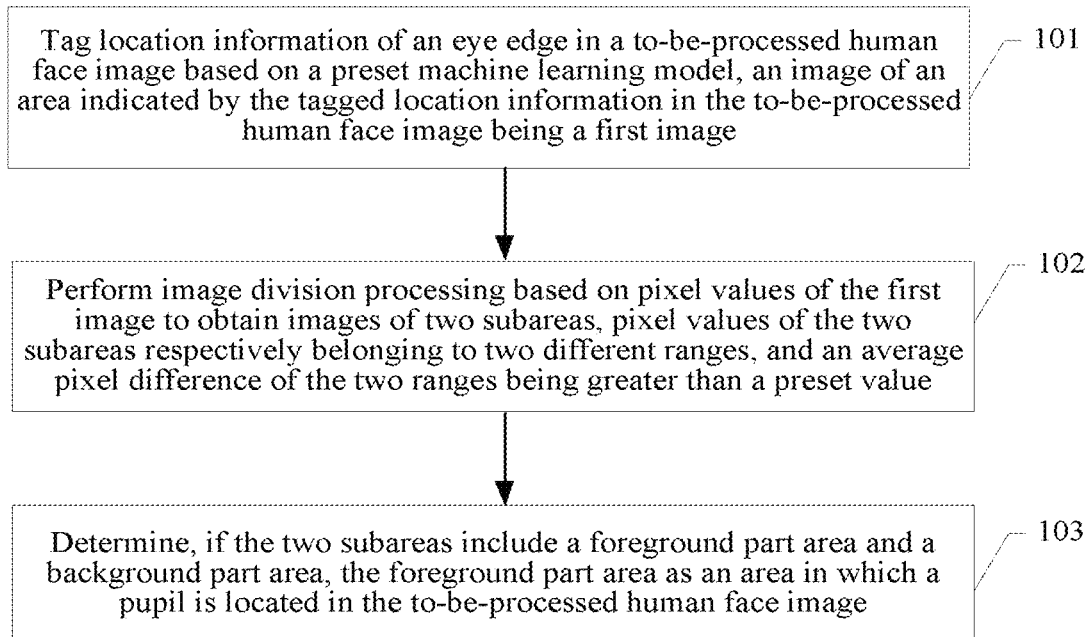
FIG. 1 is a flowchart of a pupil locating method according to an embodiment of this application.

An embodiment of this application provides a pupil locating method, which is mainly a method executed by a pupil locating system. An embodiment of the pupil locating method is illustrated in the flowchart shown in FIG. 1, and includes the following steps:

Step 101. Tag location information of an eye edge in a to-be-processed human face image based on a preset machine learning model, an image of an area indicated by the tagged location information in the to-be-processed human face image being a first image.

It may be understood that, the pupil locating system may obtain a machine learning model by performing training based on location information of edges of eyes in multiple sample human face images, for example, performing training by using a regression tree or other methods. The machine learning model includes predicted location information of edges of eyes of types of human face images. Then the pupil locating system stores the machine learning model in the system, to tag location information of an eye edge in a to-be-processed human face image based on the machine learning model in real time. Generally, location information of an eye edge is tagged by using six pieces of two-dimensional location information (for example, two-dimensional coordinates). The first image obtained in this step may include an eye white part image and a pupil part image. The machine learning model may alternatively be obtained by a background server by performing training based on location information of eye edges in multiple sample human face images, and then provided to a pupil locating system of a terminal device. Alternatively, the machine learning model may be directly obtained by the pupil locating system of the terminal device by performing training based on location information of eye edges in multiple sample human face images; in this case, the multiple sample human face images may be directly obtained by the pupil locating system of the terminal device, or may be provided by the background server to the pupil locating system of the terminal. In this embodiment, the background server may be a single physical server or a physical server cluster.

Step 102. Perform image division processing based on pixel values of the first image to obtain images of two subareas, pixel values of the two subareas respectively belonging to two different ranges, and an average pixel difference of the two ranges being greater than a preset value.

Specifically, due to a large pixel value difference between the pupil part image and the eye white part image, the images of the subareas that are obtained by the pupil locating system and within two different ranges with a large average pixel difference can distinguish the pupil part image and the eye white part image in the first image. Specifically, a binarization method may be used to divide the first image into the two subareas.

In a case, during image division processing, the pupil locating system may directly divide the first image into the two subareas based on the pixel values of the first image. Specifically, a first pixel value threshold may be first determined, then an area in which a point whose pixel value is greater than the first pixel value threshold is located in the first image is used as one subarea, and an area in which a point whose pixel value is not greater than the first pixel value threshold is located in the first image is used as the other subarea.

In another case, during image division processing, the pupil locating system may first remove colors from the first image, that is, gray the first image based on the pixel values of the first image, to obtain a gray image, that is, a second image, of the first image, so that information of the second image includes texture information of the first image, and does not include color information, to avoid interference caused by the color information on a subsequent operation; and then divide the second image into the two subareas based on pixel values of the second image. Specifically, a second pixel value threshold is determined, an area in which a point whose pixel value is greater than the second pixel value threshold is located in the second image is used as one subarea, and an area in which a point whose pixel value is not greater than the second pixel value threshold is located in the second image is used as the other subarea.

It is noted that, the first pixel value threshold and the second pixel value threshold may be fixed values entered by a user to the system based on actual experience, or may be obtained respectively based on the pixel values of the first image and the second image. Specifically, when determining the second pixel value threshold, the pupil locating system may count quantities of pixels corresponding to the pixel values in the second image, to obtain a correspondence between a pixel quantity and a pixel value; and then use a pixel value corresponding to a trough between two peaks of the counted quantities of pixels as the second pixel value threshold, or select, in an interval including a trough between two peaks of the counted quantities of pixels, an optimum pixel value corresponding to an optimum value as the second pixel value threshold. For example, an average variance between the optimum pixel value and another pixel value in the second image other than the optimum pixel value is maximum.

Step 103. Determine, when the two subareas obtained through processing in step 102 include a foreground part area and a background part area, the foreground part area as an area in which a pupil is located in the to-be-processed human face image.

Further, in some cases, after the operation of step 102 is performed, the images of the two subareas are not strictly distinguished as a foreground part image and a background part image, and some interference parts exist on left and right sides. Therefore, after performing step 102, the pupil locating system further needs to perform interference elimination processing, to eliminate interference on the left and right sides of the foreground part image. Specifically:

In a case, after performing step 102, the pupil locating system sets a pixel value of each pixel an image of a first subarea of the two subareas to a first value, and sets a pixel value of each pixel an image of a second subarea of the two subareas to a second value. For example, the first value is 255 and the second value is 0, or the first value is 0 and the second value is 255, where an image having a pixel value of 255 is displayed in white, and an image having a pixel value of 0 is displayed in black. During interference elimination processing, if a pixel value of the foreground part image is the first value, and a pixel value of the background part image is the second value, the pupil locating system may set, if a quantity of pixels whose pixel values are the first value in a column of images is less than a preset quantity, the pixel values of the pixels whose pixel values are the first value in the column of images to the second value.

As can be seen, in the method of this embodiment, during pupil location, a pupil locating system first tags location information of an edge of an eye in a to-be-processed human face image based on a preset machine learning model, and then performs image division processing based on pixel values of an area, that is, a first image, indicated by the tagged location information to obtain images of two subareas, to determine a subarea, that is, a foreground part area, in the two subareas as an area in which a pupil of the eye is located in the to-be-processed human face image. Therefore, location information of an eye edge can be tagged by using a simple machine learning model, and then real-time pupil location can be implemented by using an image processing method, which reduces complexity and locates a pupil more accurately as compared with the existing technology in which location information of a pupil is directly tagged.

Figure 2:
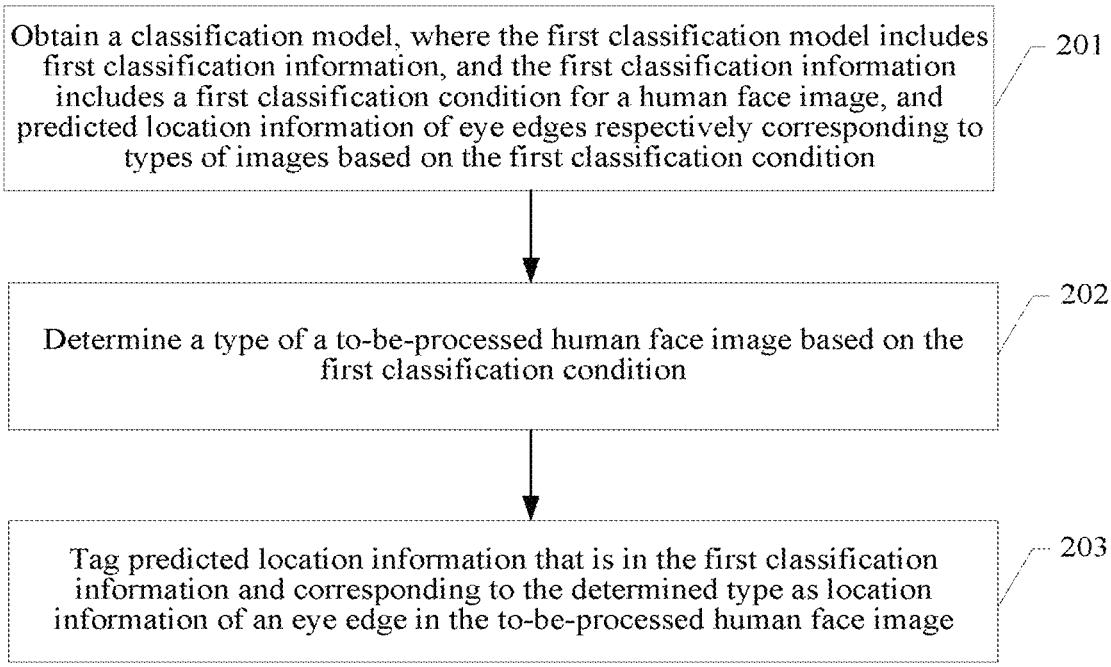
FIG. 2 is a flowchart of a method for tagging location information of an eye edge in a to-be-processed human face image according to an embodiment of this application.

Referring to FIG. 2, in a specific embodiment, the preset machine learning model is a first classification model, and the pupil locating system may tag the location information of the eye edge in the to-be-processed human face image by performing the following steps. Specifically:

Step 201. Obtain a first classification model, where the first classification model includes first classification information, and the first classification information includes a first classification condition for a human face image, and predicted location information of eye edges respectively corresponding to types of images based on the first classification condition.

Generally, the first classification model is obtained by performing training based on multiple training human face images, and a group of first classification information may be represented by a classification tree. Each leaf node of the classification tree includes a type of human face images, average location information of edges of eyes of the type of human face images is predicted location information of the type of human face images, and next-level leaf nodes of each leaf node respectively include types of human face images obtained after the type of human face images in the leaf node is further classified based on the first classification condition.

The first classification condition may be whether an absolute difference between pixel values of two pixels of an eye area in a human face image is greater than a threshold, if the absolute difference is greater than the threshold, the human face image belongs to a type of human face images, or if the absolute difference is not greater than the threshold, the human face image belongs to another type of human face images. The two pixels may be any two pixels.

Step 202. Determine a type of a to-be-processed human face image based on the first classification condition.

Step 203. Tag predicted location information that is in the first classification information and corresponding to the type determined in step 202 as location information of an eye edge in the to-be-processed human face image.

Figure 3:
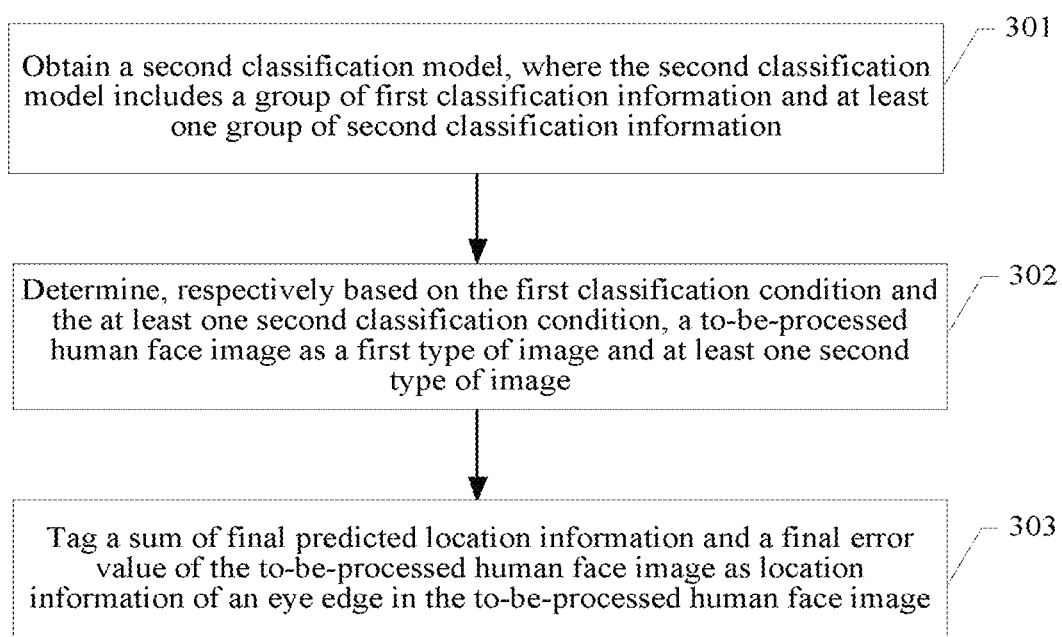
FIG. 3 is a flowchart of another method for tagging location information of an eye edge in a to-be-processed human face image according to an embodiment of this application.

Referring to FIG. 3, in another specific embodiment, the preset machine learning model is a second classification model, and the pupil locating system may tag the location information of the eye edge in the to-be-processed human face image by performing the following steps. Specifically:

Step 301. Obtain a second classification model, where the second classification model includes a group of first classification information and at least one group of second classification information, where the first classification information includes a first classification condition for a human face image, and predicted location information of eye edges respectively corresponding to types of images based on the first classification condition; and each of the at least one group of second classification information includes a second classification condition for a human face image, predicted location information of eye edges respectively corresponding to types of images based on the second classification condition, and an error value of the predicted location information corresponding to the types of images.

It may be understood that, the second classification model is obtained by performing training based on multiple training human face images, and a group of first classification information (including the first classification information or the second classification information) may be represented by a classification tree. Each leaf node of the classification tree includes a type of human face images, average location information of eye edges of the type of human face images is predicted location information of the type of human face images, and next-level leaf nodes of each leaf node respectively include types of human face images obtained after the type of human face images in the leaf node is further classified based on the first classification condition.

As for a classification tree corresponding to each of the at least one group of second classification information, information of each leaf node further includes an error value of a type of human face images included in the leaf node. The error value is a sum of differences between actual location information of human face images in the type of human face images and current predicted location information of the corresponding human face images. In this way, one leaf node corresponds to one error value. Current predicted location information of a human face image is a sum of predicted location information of corresponding human face images in at least two classification trees (respectively representing at least two groups of classification information, including second classification information of the current classification trees).

The first classification condition and the second classification condition may both be whether an absolute difference between pixel values of two pixels of an eye area in a human face image is greater than a threshold, when the absolute difference is greater than the threshold, the human face image belongs to a type of human face images, and when the absolute difference is not greater than the threshold, the human face image belongs to another type of human face images. The two pixels may be any two pixels.

Step 302. Determine, respectively based on the first classification condition and the at least one second classification condition, a to-be-processed human face image as a first type of image and at least one second type of image.

Step 303. Tag a sum of final predicted location information and a final error value of the to-be-processed human face image as location information of an eye edge in the to-be-processed human face image, where the final predicted location information is a sum of predicted location information, of the first type of image, in the first classification information and predicted location information that is in the at least one group of second classification information and respectively corresponding to second types of images; and the final error value is a sum of error values that are in the at least one group of second classification information and respectively corresponding to the second types of images.

In this embodiment, when tagging the location information of the eye edge in the to-be-processed human face image, the pupil locating system considers an error in training based on training human face images, so that the tagged location information of the eye edge is more accurate.

In a specific embodiment, when training the second classification model, the pupil locating system may form a first classification tree, where multiple next-level leaf nodes of a leaf node of the first classification tree are respectively multiple types of training human face images obtained based on the first classification condition by using multiple training human face images included in the leaf node; and store the first classification information, where the first classification information includes predicted location information corresponding to leaf nodes in the first classification tree and the first classification condition. The pupil locating system may also form at least one second classification tree, where multiple next-level leaf nodes of a leaf node of the second classification tree are respectively multiple types of training human face images obtained based on the second classification condition by using multiple training human face images included in the leaf node; and store the at least one group of second classification information, where each of the at least one group of second classification information includes predicted location information corresponding to leaf nodes in a second classification tree, the second classification condition, and an error value of predicted location information of a leaf node.

According to some embodiments, predicted location information of a leaf node is an average of location information of eye edges in multiple training human face images included in the leaf node. The first classification condition and the second classification condition may both include (i) that an absolute difference between pixel values of two pixels of an eye area in multiple training human face images included in each leaf node is greater than or is not greater than a threshold, and (ii) location information of the two pixels. An error value of a leaf node may be a sum of differences between actual location information of training human face images in the leaf node and current predicted location information of the corresponding training human face images. Current predicted location information of a training human face image may be a sum of predicted location information of corresponding training human face images in at least two groups of classification information (including a current group of second classification information).

It is noted that, during classification tree generation, if any one of the following conditions is satisfied, the pupil locating system may stop further generating a classification tree described above (including a first classification tree or a second classification tree): a depth of a classification tree reaches a preset depth, classification times reaches preset times, and an error of predicted location information of each type of training human face images is less than a preset error.

Figure 4:
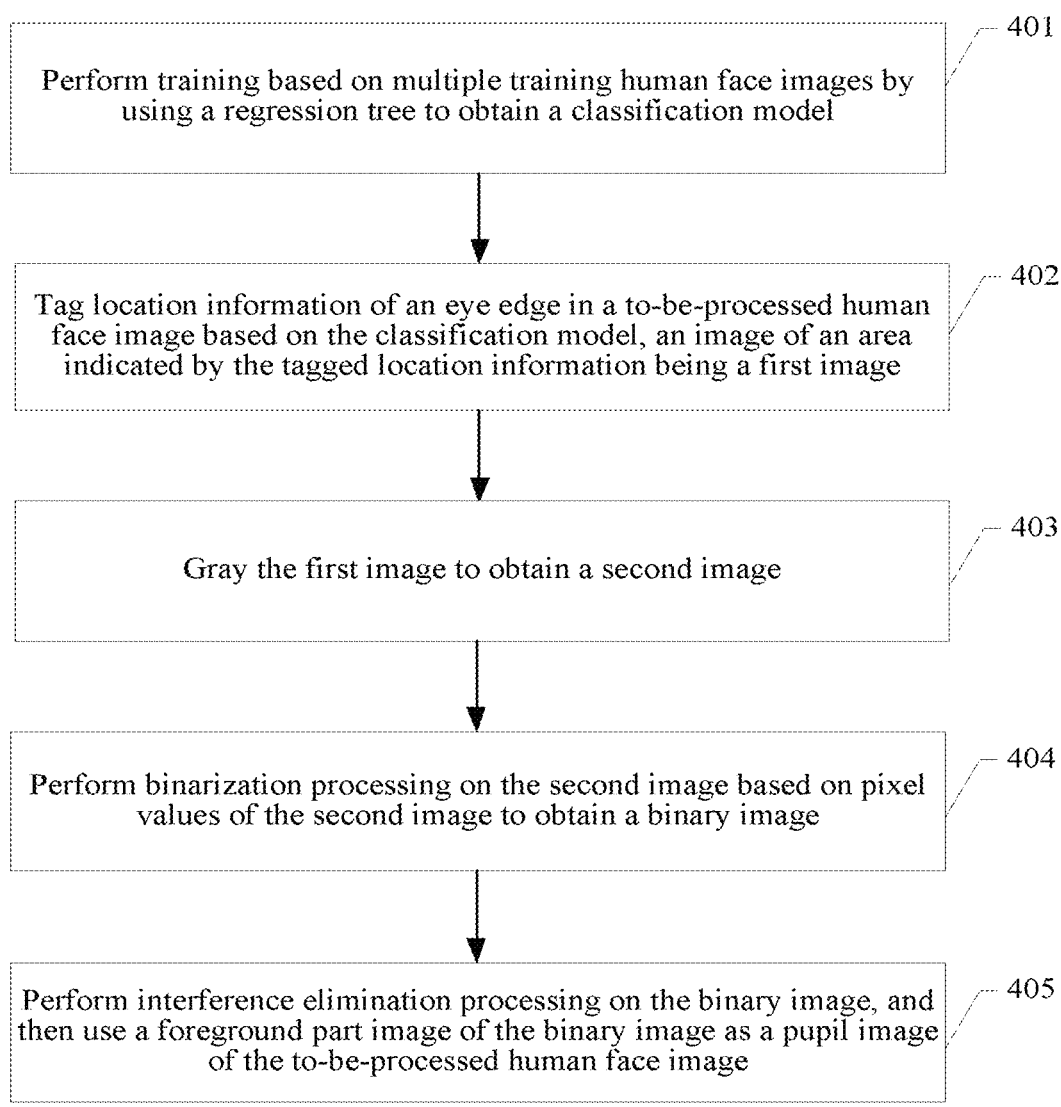
FIG. 4 is a flowchart of a pupil locating method according to an application embodiment of this application.

The pupil locating method in this embodiment is described below by using a specific embodiment. Referring to FIG. 4, the method in this embodiment specifically includes the following steps:

Step 401. Perform training based on multiple training human face images by using a regression tree to obtain a classification model.

Figure 5:
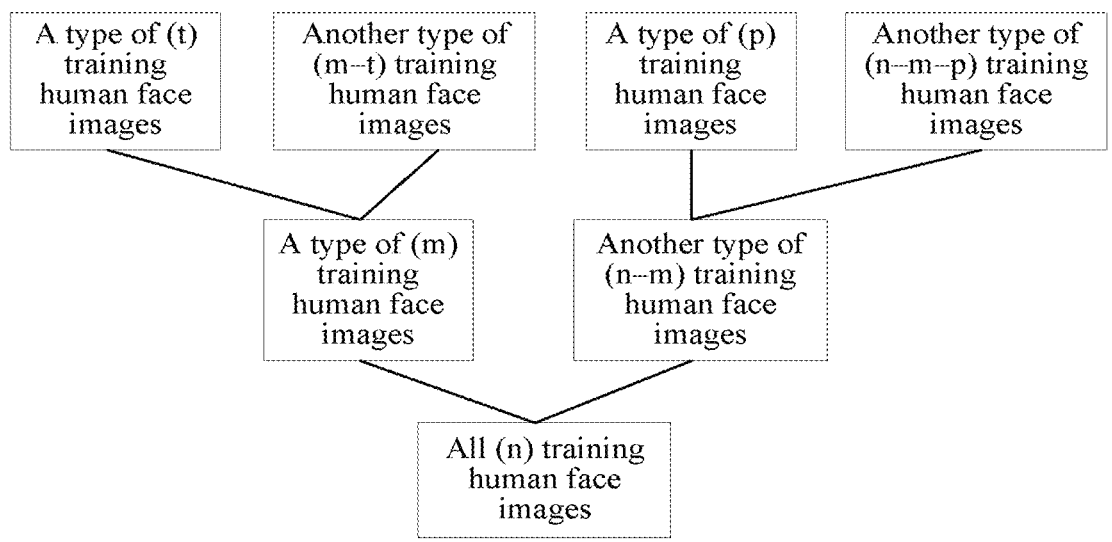
FIG. 5 is a schematic diagram of a generated classification tree according to an application embodiment of this application.

Specifically, referring to FIG. 5, a pupil locating system classifies multiple (for example, n) training human face images into two types, then classifies each type of training human face images into two types, and so on. If classification times reaches preset times, a depth of a classification tree reaches a preset depth, or an error of predicted location information of each type of training human face images is less than a preset error, the pupil locating system stops classifying the training human face images. In this way, a first classification tree can be formed. Then the pupil locating system stores the first classification tree as a group of first classification information, which specifically includes predicted location information of leaf nodes and a first classification condition. Predicted location information of each leaf node is average location information of eye edges of multiple training human face images included in the leaf node. The classification condition may include information that an absolute difference between pixel values of two pixels of an eye area in a training human face image is greater than (or is not greater than) a threshold, specific location information of the two pixels, and the like.

The pupil locating system may also generate a second classification tree by using the same method for generating the first classification tree. Differently, the pupil locating system calculates an error value corresponding to each leaf node. The error value is a sum of differences between actual location information of multiple training human face images included in the leaf node and current predicted location information of the corresponding training human face images. Current predicted location information of a training human face image is a sum of predicted location information of corresponding training human face images in the first classification tree and the second classification tree. The pupil locating system also stores the second classification tree as a group of second classification information, which specifically includes predicted location information of leaf nodes, a classification condition, and an error value.

The pupil locating system may also generate a third classification tree by using the same method for generating the second classification tree. Differently, when the pupil locating system calculates an error value corresponding to each leaf node, current predicted location information of a training human face image is a sum of predicted location information of corresponding training human face images in the first classification tree, the second classification tree, and the third classification tree.

Multiple classification trees may be generated by analogy using the method. When an error of predicted location information of each type of training human face images is less than the preset error, further classification tree generation is stopped. Information of classification trees stored in the pupil locating system forms a trained classification model, and may specifically include a group of first classification information and multiple groups of second classification information.

Step 402. Tag location information of an eye edge in a to-be-processed human face image based on the classification model, an image of an area indicated by the tagged location information being a first image.

Specifically, the pupil locating system may classify the to-be-processed human face image as a first type of image (that is, belonging to a leaf node) based on the group of first classification information in the classification model, and obtain predicted location information corresponding to the leaf node from the classification model. The pupil locating system may obtain multiple pieces of predicted location information of the to-be-processed human face image and multiple error values based on the multiple groups of second classification information in the classification model. Accordingly, the location information of the eye edge in the to-be-processed human face image is a sum of a first sum of the multiple pieces of predicted location information and a second sum of the multiple error values obtained from the classification model.

Step 403. Gray the first image, that is, remove color information of the first image, to obtain a second image. The second image includes texture information, and pixel values (that is, grayscale values) of pixels in the obtained second image range from 0 to 255.

Step 404. Perform binarization processing on the second image based on pixel values of the second image to obtain a binary image, and divide the binary image into images of two areas, that is, a foreground part image and a background part image.

Specifically, the pupil locating system may determine a pixel value threshold, then use an area in which a point whose pixel value is greater than the pixel value threshold is located in the second image as one subarea, and set a pixel value of each pixel in the subarea to 0 (or 255); and use an area in which a point whose pixel value is not greater than the pixel value threshold is located in the second image as the other subarea, and set a pixel value of each pixel in the other subarea to 255 (or 0), to obtain a binary image.

The pixel value threshold may be determined based on an empirical value. However, because eyes of persons may have different eye white and pupil grayscale distribution, the effect is not ideal when the second image is divided by using a fixed threshold. Therefore, there may be an adaptive threshold.

Figure 6:
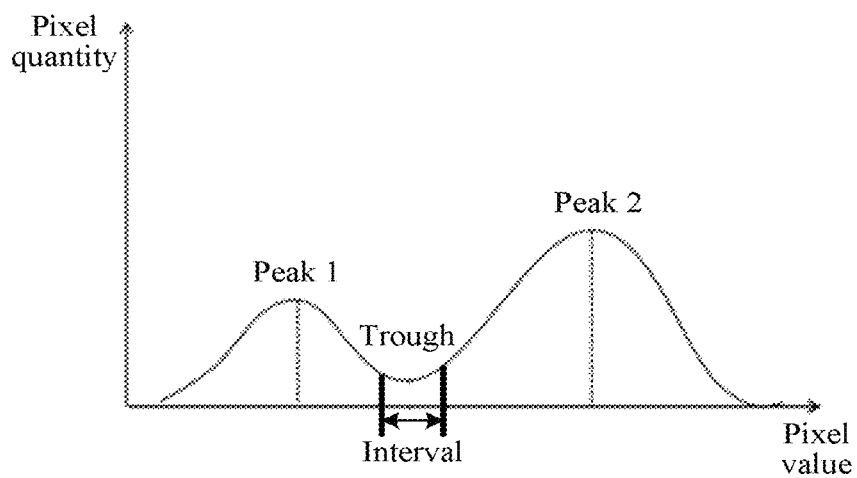
FIG. 6 is a statistical graph of pixel values and pixel quantities according to an application embodiment of this application.

Specifically, the pupil locating system may count quantities of pixels of the pixel values in the second image, to obtain a graph shown in FIG. 6, that is, a relationship diagram between pixel quantities and pixel values, and then may use a pixel value corresponding to a trough between two peaks (a peak 1 and a peak 2) of the quantities of pixels as the pixel value threshold; or select, in an interval including a trough between two peaks of the quantities of pixels, an optimum pixel value corresponding to an optimum value as the pixel value threshold. An average variance between the optimum pixel value and another pixel value in the second image other than the optimum pixel value may be maximum.

Step 405. Perform interference elimination processing on the binary image, and then use a foreground part image of the binary image as a pupil image of the to-be-processed human face image.

Specifically, the pupil locating system may first eliminate interference in left and right areas in the binary image by using a vertical projection method, to obtain an interference-eliminated image, and then perform morphological corrosion processing on the interference-eliminated image to eliminate tiny interference factors, to obtain a pupil image.

When the vertical projection method is used, if the binary image includes a foreground part image and a background part image, whose pixel values are respectively 0 and 255, the pupil locating system may scan pixel values of pixels in each column of images in the binary image from top to bottom, to count a quantity Ci of pixels whose pixel values are 0 in each column of images, where i is greater than or equal to 0, and is less than or equal to W. W herein is a quantity of columns of pixels in the binary image. If the quantity Ci of pixels whose pixel values are 0 in a column of images is less than a preset quantity Tp, the pupil locating system sets pixel values of all pixels in the column of images to 255, that is, the pixel value of the background part image. Specifically, as shown in the following formula 1, p(i,j) is a pixel value of column i and row j in the binary image:

$$p(i, j) = \begin{cases} p(i, j), Ci \geq Tp \\ 255, Ci < Tp \end{cases} \quad (1)$$

During morphological corrosion processing, the pupil locating system may eliminate some interfering pixels in the interference-eliminated image, which is specifically removing pixel values of pixels whose pixel values are the first value (that is, 0) in an edge area of the interference-eliminated image.

Figure 7A:
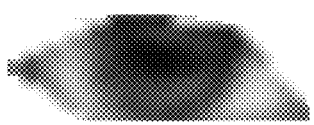
FIG. 7a is a schematic diagram of a generated second image according to an application embodiment of this application.
Figure 7B:
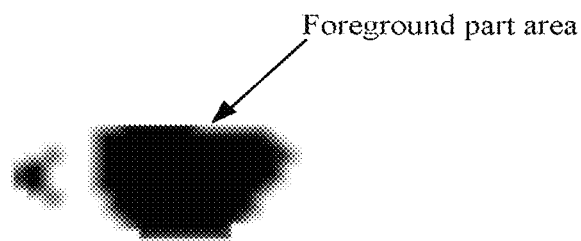
FIG. 7b is a schematic diagram of a generated binary image according to an application embodiment of this application.
Figure 7C:
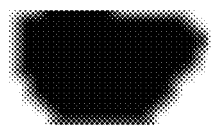
FIG. 7c is a schematic diagram of a generated pupil image according to an application embodiment of this application.

For example, FIG. 7a shows a second image, that is, a gray image, obtained after processing in step 403, FIG. 7b shows a binary image obtained after processing in step 404, and FIG. 7c shows a pupil image obtained after processing in step 405.

Figure 8:
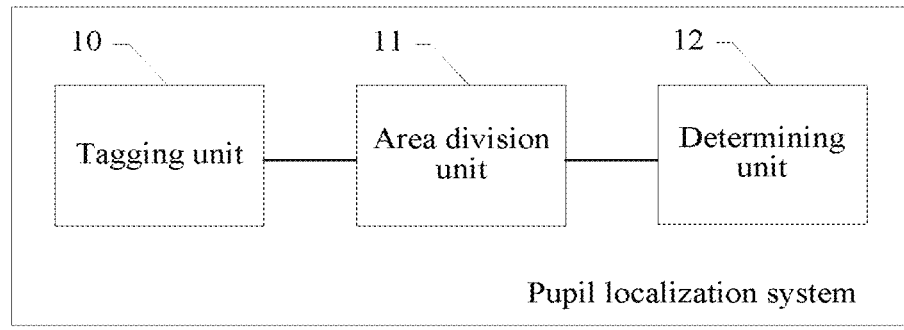
FIG. 8 is a schematic structural diagram of a pupil locating system according to an embodiment of this application.

An embodiment of this application further provides a pupil locating system, a schematic structural diagram of which is shown in FIG. 8, and may specifically include: a tagging unit 10, an area division unit 11, and a determining unit 12.

The tagging unit 10 is configured to tag location information of an edge of an eye in a to-be-processed human face image based on a preset machine learning model, the preset machine learning model including predicted location information of edges of eyes of types of human face images, and an area indicated by the tagged location information in the to-be-processed human face image being a first image.

The area division unit 11 is configured to perform image division processing based on pixel values of the first image obtained by the tagging unit 10 to obtain images of two subareas, pixel values of the two subareas respectively belonging to two different ranges, and an average pixel difference of the two different ranges being greater than a preset value.

The determining unit 12 is configured to determine, when the two subareas include a foreground part area and a background part area, the foreground part area divided by the area division unit 11 as an area in which a pupil of the eye is located in the to-be-processed human face image.

When dividing the first image, the area division unit 11 is specifically configured to divide the first image into the two subareas based on the pixel values of the first image; or gray the first image based on the pixel values of the first image to obtain a second image, and divide the second image into the two subareas based on pixel values of the second image.

In a case, the area division unit 11 determines a first pixel value threshold; and uses an area in which a point whose pixel value is greater than the first pixel value threshold is located in the first image as one subarea, and uses an area in which a point whose pixel value is not greater than the first pixel value threshold is located in the first image as the other subarea. In another case, the area division unit 11 determines a second pixel value threshold; and uses an area in which a point whose pixel value is greater than the second pixel value threshold is located in the second image as one subarea, and uses an area in which a point whose pixel value is not greater than the second pixel value threshold is located in the second image as the other subarea.

In a specific embodiment, when determining the second pixel value threshold, the area division unit 11 is specifically configured to count quantities of pixels corresponding to the pixel values in the second image; and use a pixel value corresponding to a trough between two peaks of the counted quantities of pixels as the second pixel value threshold; or select, in an interval including a trough between two peaks of the counted quantities of pixels, an optimum pixel value corresponding to an optimum value as the second pixel value threshold.

Herein, an average variance between the optimum pixel value and another pixel value in the second image other than the optimum pixel value is maximum.

As can be seen, in the system of this embodiment, during pupil location, the tagging unit 10 first tags location information of an eye edge in a to-be-processed human face image based on a preset machine learning model, and then the area division unit 11 performs image division processing based on pixel values of an area indicated by the tagged location information to obtain images of two subareas, so that the determining unit 12 can determine a subarea, that is, a foreground part area, in the two subareas as an area in which a pupil is located in the to-be-processed human face image. Therefore, location information of an eye edge can be tagged by using a simple machine learning model, and then real-time pupil location can be implemented by using an image processing method, which reduces complexity and locates a pupil more accurately as compared with the existing technology in which location information of a pupil is directly tagged.

Figure 9:
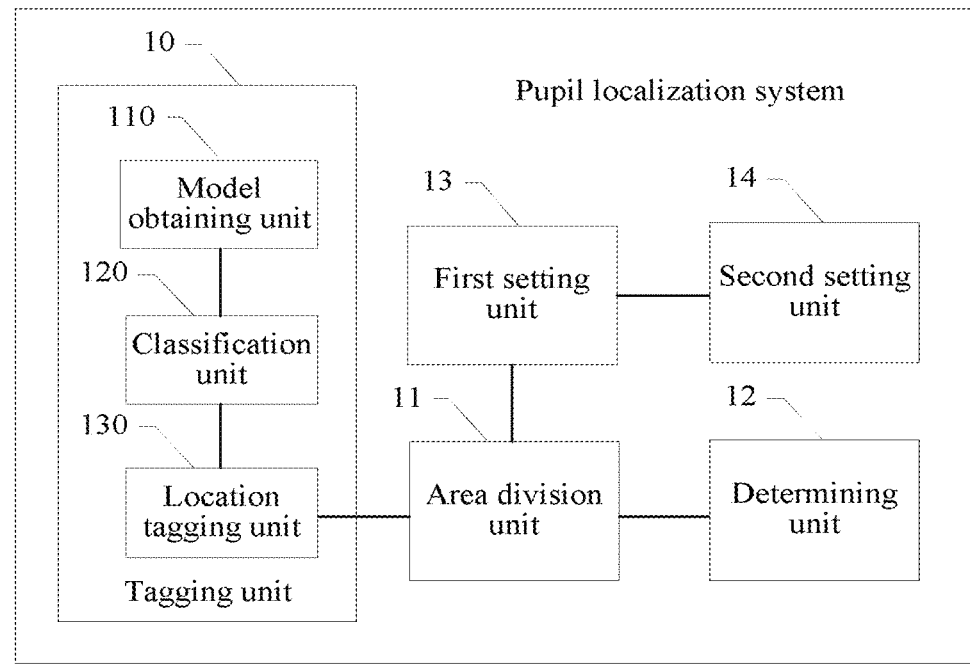
FIG. 9 is a schematic structural diagram of another pupil locating system according to an embodiment of this application.

Referring to FIG. 9, in a specific embodiment, in addition to the structure shown in FIG. 8, the pupil locating system may further include a first setting unit 13 and a second setting unit 14, and the tagging unit 10 in the system may be implemented by using a model obtaining unit 110, a classification unit 120, and a location tagging unit 130.

In some embodiments, the preset machine learning model is a first classification model, and the model obtaining unit 110 is configured to obtain the first classification model, where the first classification model includes first classification information, and the first classification information includes a first classification condition for a human face image, and predicted location information of eye edges respectively corresponding to types of images based on the first classification condition; the classification unit 120 is configured to determine a type of the to-be-processed human face image based on the first classification condition obtained by the model obtaining unit 110; and the location tagging unit 130 is configured to tag predicted location information that is in the first classification information and corresponding to the type determined by the classification unit 120 as the location information of the eye edge in the to-be-processed human face image.

In some embodiments, the preset machine learning model is a second classification model, and the model obtaining unit 110 is further configured to obtain the second classification model, where the second classification model includes a group of first classification information and at least one group of second classification information, where the first classification information includes a first classification condition for a human face image, and predicted location information of eye edges respectively corresponding to types of images based on the first classification condition; and each of the at least one group of second classification information includes a second classification condition for a human face image, predicted location information of eye edges respectively corresponding to types of images based on the second classification condition, and an error value of the predicted location information corresponding to the types of images; the classification unit 120 is further configured to determine, respectively based on the first classification condition and the at least one second classification condition that are obtained by the model obtaining unit 110, the to-be-processed human face image as a first type of image and at least one second type of image; and the location tagging unit 130 is further configured to tag a sum of final predicted location information and a final error value of the to-be-processed human face image as the location information of the eye edge in the to-be-processed human face image, where the final predicted location information is a sum of predicted location information, of the first type of image determined by the classification unit 120, in the first classification information and predicted location information that is in the at least one group of second classification information and respectively corresponding to corresponding second types of images; and the final error value is a sum of error values that are in the at least one group of second classification information and respectively corresponding to the corresponding second types of images.

In some embodiments, when obtaining the second classification model, the model obtaining unit 110 is specifically configured to form a first classification tree, where multiple next-level leaf nodes of a leaf node of the first classification tree are respectively multiple types of training human face images obtained based on the first classification condition by using multiple training human face images included in the leaf node; store the first classification information, where the first classification information includes predicted location information corresponding to leaf nodes in the first classification tree and the first classification condition; form at least one second classification tree, where multiple next-level leaf nodes of a leaf node of the second classification tree are respectively multiple types of training human face images obtained based on the second classification condition by using multiple training human face images included in the leaf node; and store the at least one group of second classification information, where each group of second classification information includes predicted location information corresponding to leaf nodes in a second classification tree, the second classification condition, and an error value of predicted location information of a leaf node.

Predicted location information of a leaf node may be an average location information of eye edges in multiple training human face images included in the leaf node, and the first classification condition and the second classification condition both include that an absolute difference between pixel values of two pixels of an eye area in multiple training human face images included in each leaf node is greater than or is not greater than a threshold, and location information of the two pixels. An error value of a leaf node may be a sum of differences between actual location information of training human face images in the leaf node and current predicted location information of the corresponding training human face images. Current predicted location information of a training human face image may be a sum of predicted location information of corresponding training human face images in at least two groups of classification information (including a current group of second classification information).

After the area division unit 11 divides the two subareas, the first setting unit 13 may be configured to set a pixel value of each pixel an image of a first subarea of the two subareas to a first value, and set a pixel value of each pixel an image of a second subarea of the two subareas to a second value.

The second setting unit 14 is configured to: after setting processing of the first setting unit 13, if a pixel value of a foreground part image in the images of the two subareas is the first value, and a pixel value of a background part image is the second value, set, if a quantity of pixels whose pixel values are the first value in a column of images is less than a preset quantity, the pixel values of the pixels whose pixel values are the first value in the column of images to the second value.

Figure 10:
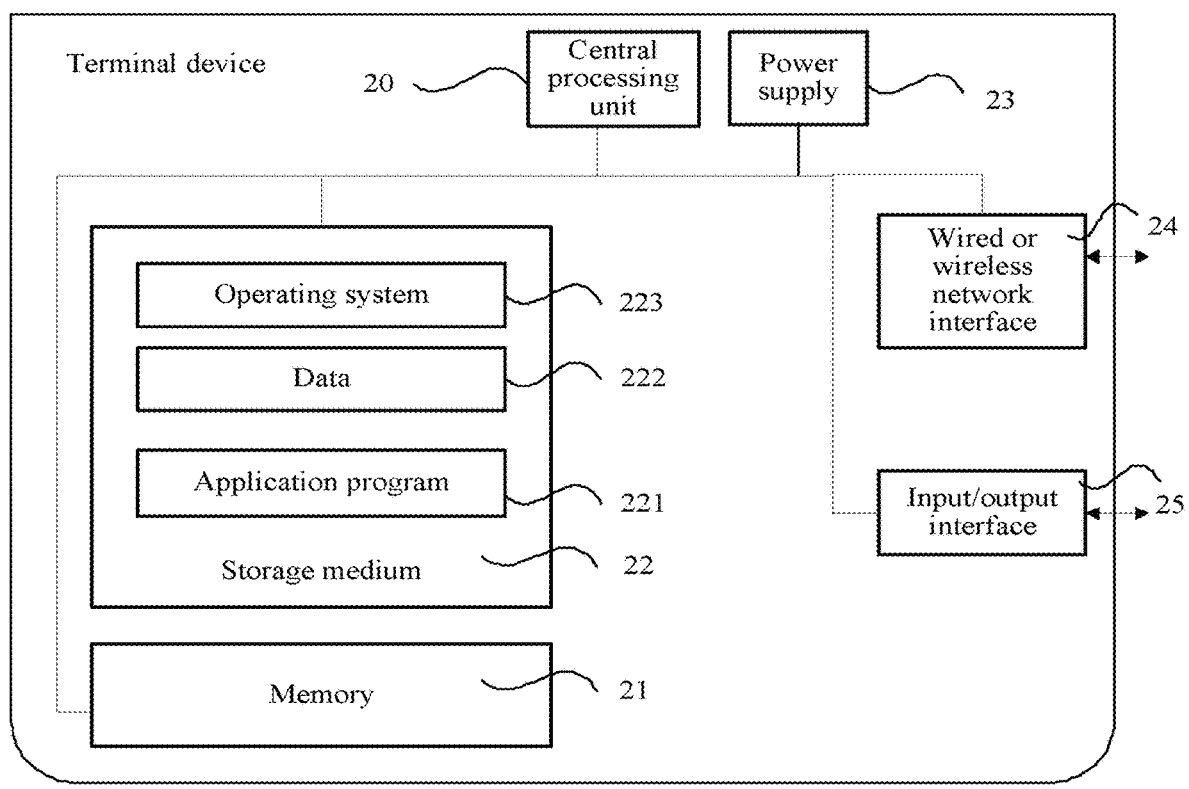
FIG. 10 is a schematic structural diagram of a terminal device according to an embodiment of this application.

An embodiment of this application further provides a terminal device, a schematic structural diagram of which is shown in FIG. 10. The terminal device may vary greatly with different configuration or performance, and may include one or more central processing units (CPUs) 20 (for example, one or more processors), a memory 21, and one or more storage media 22 (for example, one or more massive storage devices) storing an application program 221 or data 222. The memory 21 and the storage medium 22 may be a transitory storage or a persistent storage. The program stored in the storage medium 22 may include one or more modules (not shown in the figure), and each module may include a series of instruction operations for the terminal device. Furthermore, the CPU 20 may be configured to communicate with the storage medium 22, and perform a series of instruction operations in the storage medium 22 on the terminal device.

Specifically, the application program 221 stored in the storage medium 22 includes a pupil locating application program, and the program may include the tagging unit 10, the area division unit 11, the determining unit 12, the first setting unit 13, and the second setting unit 14 in the pupil locating system, as depicted in FIG. 9. Details are not described herein again. Furthermore, the CPU 20 may be configured to communicate with the storage medium 22, and perform a series of instruction operations corresponding to the pupil locating application program stored in the storage medium 22 on the terminal device.

The terminal device may further include one or more power supplies 23, one or more wired or wireless network interfaces 24, one or more input/output interfaces 25, and/or one or more operating systems 223, for example, Windows Server™, Mac OS X™, Unix™, Linux™, or FreeBSD™.

Steps in the method embodiment and performed by the pupil locating system may be based on the structure of the terminal device shown in FIG. 10.

Persons of ordinary skill in the art may understand that all or some of the steps of the methods in the embodiments may be implemented by a program instructing relevant hardware. The program may be stored in a computer-readable storage medium. The storage medium may include: a read-only memory (ROM), a random access memory (RAM), a magnetic disk, or an optical disc.

The pupil locating method and system provided in the embodiments of this application are detailed above. Although the principles and implementations of this application are described by using specific examples in this specification, the foregoing descriptions of the embodiments are intended to help understand the method and the core idea of this application. Meanwhile, persons of ordinary skill in the art may make variations to the specific implementations and application range according to the idea of this application. In conclusion, the content of the specification should not be construed as a limitation to this application.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

What is claimed is:

1. A method for locating a pupil, comprising:

determining, by processing circuitry of an information processing device, a location of an edge of an eye in a first image of a face according to a plurality of two-dimensional location information generated by a machine learning model that utilizes types of first face images and a difference between pixel values of an eye area of the first image of the face;

determining, by the processing circuitry, an area of the first image based on the location determined according to the plurality of two-dimensional location information;

dividing, by the processing circuitry, the area of the first image into first and second subareas based on pixel values of the area of the first image, the first subarea including the pixel values of a first range and the second subarea including the pixel values of a second range, and an average pixel difference of the first and second ranges being greater than a threshold; and determining, by the processing circuitry, the location of the pupil based on a location of one of the first and second subareas when the average pixel difference of the first and second ranges is greater than the threshold.

2. The method of claim 1, wherein the determining the location of the edge of the eye comprises:

determining, by the processing circuitry, a type of the first image based on a preset the machine learning model; and determining, by the processing circuitry, predicted location information corresponding to the determined type of the first image, the determined predicted location information indicating the location of the edge of the eye in the first image, wherein the machine learning model includes first classification information, which includes a first classification condition for the first face images and predicted location information of edges of eyes corresponding to the types of the first face images based on the first classification condition.

3. The method of claim 1, wherein the determining the location of the edge of the eye comprises:
determining, by the processing circuitry, based on the machine learning model, a first type of the first image and at least one second type of the first image, wherein the machine learning model includes a group of first classification information and at least one group of second classification information, the group of the first classification information includes a first classification condition for the first face images and first predicted location information of edges of eyes corresponding to the types of the first face images based on the first classification condition of the group; and each of the at least one group of the second classification information includes a second classification condition for second face images, second predicted location information of edges of eyes corresponding to types of the second face images based on the second classification condition of the each of the at least one group of the second classification information, and error values of the second predicted location information; and
determining, by the processing circuitry, a sum of final predicted location information and final error values of the second predicted location information, wherein the final predicted location information is a sum of the first predicted location information corresponding to the determined first type of the first image and the second predicted location information corresponding to the determined at least one second type of the first image; and the final error values of the second predicted location information is a sum of error values of the second predicted location information corresponding to the determined at least one second type of the first image, the determined sum of the final predicted location information and the final error values of the second predicted location information indicating the location of the edge of the eye in the first image.

4. The method of claim 3, further comprising:
generating, by the processing circuitry, a first classification tree, wherein multiple next-level leaf nodes of a leaf node of the first classification tree correspond to the types of the first face images, which are obtained based on the first classification condition of the first classification information by using the first face images of the leaf node of the first classification tree;
storing, by the processing circuitry, the first classification information that includes the first predicted location information corresponding to leaf nodes of the first classification tree and the first classification condition;
generating, by the processing circuitry, at least one second classification tree, wherein multiple next-level leaf nodes of a leaf node of the at least one second classification tree correspond to the types of the second face images, which are obtained based on the second classification condition of the at least one group of second classification information by using the second face images of the leaf node of the at least one second classification tree; and
storing, by the processing circuitry, the at least one group of second classification information, each of the at least one group of second classification information includes the second predicted location information corresponding to leaf nodes of the respective second classification tree, the second classification condition, and error values of the second predicted location information corresponding to the leaf nodes of the respective second classification tree,
wherein the second predicted location information corresponding to the leaf node of the at least one second classification tree is average location information of edges of eyes in second face images of the leaf node,
wherein the first classification condition of the first classification information and the second classification condition of the at least one second classification information include an absolute difference between pixel values of two pixels of an eye area in the first face images of the leaf node of the first classification tree and in the second face images of the leaf node of the at least one second classification tree, the absolute difference being greater or not greater than a threshold, and location information of the two pixels.

5. The method of claim 1, wherein the dividing comprises:
graying, by the processing circuitry, the pixel values of the area of the first image to generate a second image; and
dividing, by the processing circuitry, the area of the first image into the first and second subareas based on the grayed pixel values of the area of the first image.

6. The method of claim 5, wherein the dividing comprises:
determining, by the processing circuitry, a second pixel value threshold, wherein a first grayed area of the area of the first image containing a first point with the pixel value greater than the second pixel value threshold, is one of the first and second subareas; a second grayed area of the area of the first image containing a second point with the pixel value equal to or less than the second pixel value threshold, is the other of the first and second subareas.

7. The method of claim 6, wherein the determining the second pixel value threshold comprises:
counting, by the processing circuitry, frequencies of the pixel values of the second image; and
selecting, by the processing circuitry, one of:
a pixel value corresponding to a trough between two peaks of the frequencies of the pixels or in an interval including a trough between two peaks of the frequencies of the pixels as the second pixel value threshold.

8. The method of claim 7, wherein an average variance between the pixel value in the interval and another pixel value in the second image is maximized.

9. The method of claim 1, wherein the dividing comprises:
determining, by the processing circuitry, a first pixel value threshold, wherein a first area of the area of the first image containing a first point with the pixel value greater than the first pixel value threshold, is one of the first and second subareas; and a second area of the area of the first image containing a second point with the pixel value equal to or less than the first pixel value threshold is the other of the first and second subareas.

10. The method of claim 1, after the dividing, further comprising:
setting, by the processing circuitry, a pixel value of one of the first and second subareas, where the pupil is located, to a first value, and a pixel value of the other one of the first and second subareas to a second value; and
setting, by the processing circuitry, when a frequency of pixels, whose pixel values are the first value, in the one of the first and second subareas is less than a preset frequency, the pixel values of the pixels to the second value.

11. A pupil locating device, comprising:
processing circuitry configured to
determine a location of an edge of an eye in a first image of a face according to a plurality of two-dimensional location information generated by a machine learning model that utilizes types of first face images and a difference between pixel values of an eye area of the first image of the face;
determine an area of the first image based on the location determined according to the plurality of two-dimensional location information;
divide the area of the first image into first and second subareas based on pixel values of the area of the first image, the first subarea including the pixel values of a first range and the second subarea including the pixel values of a second range, and an average pixel difference of the first and second ranges being greater than a threshold; and
determine a location of a pupil based on a location of one of the first and second subareas when the average pixel difference of the first and second ranges is greater than the threshold.

12. The device of claim 11, wherein the processing circuitry is configured to:
determine a type of the first image based on the machine learning model; and
determine predicted location information corresponding to the determined type of the first image, the determined predicted location information indicating the location of the edge of the eye in the first image,
wherein the machine learning model includes first classification information, which includes a first classification condition for the first face images and predicted location information of edges of eyes corresponding to the types of the first face images based on the first classification condition.

13. The device of claim 11, wherein the determination of the location of the edge of the eye further includes the processing circuitry configured to:
determine, based on the machine learning model, a first type of the first image and at least one second type of the first image, wherein the machine learning model includes a group of first classification information and at least one group of second classification information, the group of the first classification information includes a first classification condition for the first face images and first predicted location information of edges of eyes corresponding to the types of the first face images based on the first classification condition of the group; and each of the at least one group of the second classification information includes a second classification condition for second face images, second predicted location information of edges of eyes corresponding to types of the second face images based on the second classification condition of the each of the at least one group of the second classification information, and error values of the second predicted location information; and
determine a sum of final predicted location information and final error values of the second predicted location information, wherein the final predicted location information is a sum of the first predicted location information corresponding to the determined first type of the first image and the second predicted location information corresponding to the determined at least one second type of the first image; and the final error values of the second predicted location information is a sum of error values of the second predicted location information corresponding to the determined at least one second type of the first image, the determined sum of the final predicted location information and the final error values of the second predicted location information indicating the location of the edge of the eye in the first image.

14. The device of claim 13, wherein the processing circuitry is configured to:
generate a first classification tree, wherein multiple next-level leaf nodes of a leaf node of the first classification tree correspond to the types of the first face images, which are obtained based on the first classification condition of the first classification information by using the first face images of the leaf node of the first classification tree;
store the first classification information that includes the first predicted location information corresponding to leaf nodes of the first classification tree and the first classification condition;
generate at least one second classification tree, wherein multiple next-level leaf nodes of a leaf node of the at least one second classification tree correspond to the types of the second face images, which are obtained based on the second classification condition of the at least one group of second classification information by using the second face images of the leaf node of the at least one second classification tree; and
store the at least one group of second classification information, each of the at least one group of second classification information includes the second predicted location information corresponding to leaf nodes of the respective second classification tree, the second classification condition, and error values of the second predicted location information corresponding to the leaf nodes of the respective second classification tree,
wherein the second predicted location information corresponding to the leaf node of the at least one second classification tree is average location information of edges of eyes in second face images of the leaf node,
wherein the first classification condition of the first classification information and the second classification condition of the at least one second classification information include an absolute difference between pixel values of two pixels of an eye area in the first face images of the leaf node of the first classification tree and in the second face images of the leaf node of the at least one second classification tree, the absolute difference being greater or not greater than a threshold, and location information of the two pixels.

15. The device of claim 11, wherein the divide the area of the first image further includes the processing circuitry configured to:
gray the pixel values of the area of the first image to generate a second image; and
divide the area of the first image into the first and second subareas based on the grayed pixel values of the area of the first image.

16. The device of claim 15, wherein the divide the area of the first image further includes the processing circuitry configured to:
determine a second pixel value threshold, wherein a first grayed area of the area of the first image including a first point with the pixel value greater than the second pixel value threshold, is one of the first and second subareas; a second grayed area of the area of the first image including a second point with the pixel value equal to or less than the second pixel value threshold, is the other of the first and second subareas.

17. The device of claim 16, wherein the determination of the second pixel value threshold includes the processing circuitry configured to:
count frequencies of the pixel values of the second image; and
select one of:
a pixel value corresponding to a trough between two peaks of the frequencies of the pixels or in an interval including a trough between two peaks of the frequencies of the pixels as the second pixel value threshold,
wherein an average variance between the pixel value in the interval and another pixel value in the second image is maximized.

18. The device of claim 11, wherein the divide the area of the first image further includes the processing circuitry configured to:
determine a first pixel value threshold, wherein a first area of the area of the first image including a first point with the pixel value greater than the first pixel value threshold, is one of the first and second subareas; and a second area of the area of the first image including a second point with the pixel value equal to or less than the first pixel value threshold is the other of the first and second subareas.

19. The device of claim 11, wherein, after the dividing, the processing circuitry is further configured to:
set a pixel value of one of the first and second subareas, where the pupil is located, to a first value, and a pixel value of the other one of the first and second subareas to a second value; and
set, when a frequency of pixels, whose pixel values are the first value, in the one of the first and second subareas is less than a preset frequency, the pixel values of the pixels to the second value.

20. A non-transitory computer-readable medium storing instructions which when executed by at least one processor cause the at least one processor to perform:
determining a location of an edge of an eye in a first image of a face according to a plurality of two-dimensional location information generated by a machine learning model that utilizes types of first face images and a difference between pixel values of an eye area of the first image of the face;
determining an area of the first image based on the location determined according to the plurality of two-dimensional location information;
dividing the area of the first image into first and second subareas based on pixel values of the area of the first image, the first subarea including the pixel values of a first range and the second subarea including the pixel values of a second range, and an average pixel difference of the first and second ranges being greater than a threshold; and
determining a location of a pupil based on a location of one of the first and second subareas when the average pixel difference of the first and second ranges is greater than the threshold.

* * * * *